Aug. 2, 1955  F. STUDER  2,714,537
BEARING ARRANGEMENT
Filed July 2, 1952
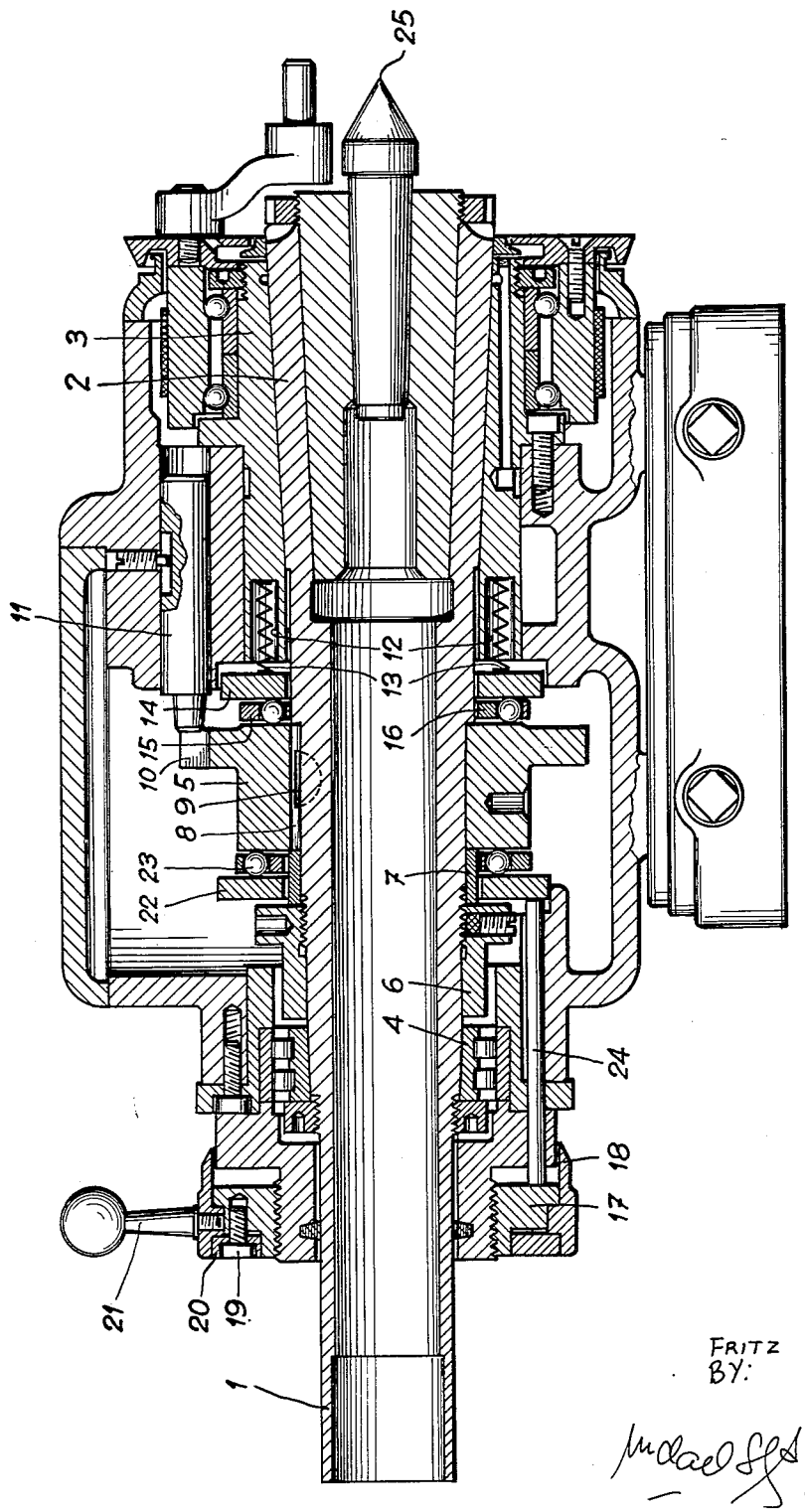
INVENTOR:
FRITZ STUDER
BY:

United States Patent Office 2,714,537
Patented Aug. 2, 1955

2,714,537

BEARING ARRANGEMENT

Fritz Studer, Glockenthal-Thun, Switzerland

Application July 2, 1952, Serial No. 296,856

Claims priority, application Switzerland July 7, 1951

7 Claims. (Cl. 308—70)

The present invention has for its object a method for the adjustment of the play in conical spindle bearings, chiefly in those intended for accuracy work in machine tools, said method providing an axial sliding of the spindle with reference to the parts carrying it.

The method according to my invention is characterized by the fact that an axial pressure is exerted on the spindle through a force acting permanently in the direction of its axis, the action of said force on the conical bearing of the spindle being adjustable even during rotation of the latter.

According to a further object of the invention, there is provided a bearing system executed in conformity with said method, said system including elastic means bearing through their ends against the body of the bearing and against the spindle respectively, so as to exert an axial pressure on the spindle, the system including, furthermore, an adjustable nut that is accessible from outside, that bears against the body of the bearing and that exerts an action opposed to the thrust exerted by the elastic means on the spindle, the angular shifting of said nut producing an axial shifting of the spindle.

An embodiment of the bearing system executed in accordance with the invention is illustrated by way of example in the accompanying drawings, the single figure of which is a cross-section of an arrangement which will be described hereinafter, together with the method forming the object of the invention.

In the drawing, 1 designates the spindle of the work-carrying headstock of a high accuracy grinding machine, the end of which spindle facing the work is provided with a conical bearing surface 2 through which the spindle is carried inside the frusto-conical bushing 3 of the headstock body. The other end of the spindle 1 is carried by a roller bearing 4 secured inside the said body and allowing an axial shifting of the spindle.

Between the bushing 3 and the bearing 4, the spindle 1 is provided with a collar or flange 5 which is held fast by means of an annular nut 6 with the interposition of a spacing sleeve 7, said flange 5 being thus urged axially against a shoulder of the spindle. In order to prevent any angular shifting of the flange 5 with reference to the spindle, a longitudinal groove 8 formed in the hub of the flange is engaged by a key 9 carried by the spindle. This flange 5 is provided at its periphery with a notch 10 adapted to be engaged, when the spindle is not rotating by a rod 11 adapted to slide inside the headstock body, so as to hold said flange fast.

The surface of the bushing 3 facing the flange 5 is provided with a plurality uniformly distributed blind recesses 12 extending in parallelism with the axis of the spindle, said recesses enclosing each a coil spring 13. The free ends of the springs 13 engage the front surface of a pressure ring 14 loosely mounted on the spindle and the opposite rear surface of which is thus urged against a thrust bearing 15 engaging in its turn the terminal front surface 16 of the flange 5.

At the rear end of the headstock body is provided an annular nut 17 that is accessible from outside and the periphery of which carries an adjustable scale-carrying annulus 18. A ring 20 fitted onto the rear side of the nut 17 by means of screws 19 secures the scale-carrying annulus 18 when the screws 19 are screwed home therein.

With a view to providing for an angular shifting of the nut 17, the scale-carrying annulus 18 rigid with the nut carries a handle secured radially thereto; said handle may also be secured directly to the nut 17 in a modified embodiment.

A second pressure ring 22 and a thrust bearing 23 are mounted on the spacing sleeve 7 between the flange 5 and the nut 6 in a manner such that the thrust bearing 23 may lie, in a manner similar to that disclosed with reference to the thrust bearing 15, between the pressure ring 22 and the flange 5.

Finally, there are mounted between the nut 17 and the pressure ring 22 pressure transmitting rods 24 distributed uniformly round the spindle and extending in parallelism with the axis of the latter, said pressure transmitting rods bearing each through one end against the free surface of the pressure ring 22 and through the other end against the terminal front surface of the nut 17 facing the flange 5.

The permanently acting pressure of the springs 13 exerts an axial thrust on the spindle 1 in a right to left direction as illustrated in the drawing so as to urge said spindle leftwards and thereby to draw the conical bearing surface 2 on the spindle into the bushing 3 until the pressure ring 22 engages the rods 24 bearing through their opposite ends against the nut 17. The nut 17 acts in an opposite direction through the rods 24 on the spindle; said nut 17 that is provided with a right handed thread causes when said nut is shifted angularly clockwise an axial shifting of the spindle against the pressure of the springs 13 towards the right hand side of the drawing while an opposite angular shifting of the nut 17 produces a similar movement towards the left hand side of the drawing under the action of the springs 13.

It will be readily understood that the axial pressure of the springs 13 in the manner disclosed, will act on the bushing 3 in a manner such that the play between the cooperating conical bearing surfaces on the parts 2 and 3 may be adjusted through an angular shifting of the nut 17 provided to this purpose with a very small pitch thread, said adjustment being highly accurate both when the spindle revolves as when it is stationary. This accurate adjustment allows for the first time to provide for the constancy at a predetermined value of the play in the bearing that may change through a change in viscosity of the lubricant, this being obtained through an adjustment of the nut 17 during operation, whereby it is possible to keep the accuracy of adjustment within a few thousandths of a millimeter as experiment has shown to be the fact.

By reason of the comparatively large range of adjustment of the nut 17, it is also possible to shift the spindle axially towards the left to an extent such that the conical bearing surface 2 of the spindle is clamped inside the bearing 3, which condition of operation is required when it is desired to machine a work between stationary stocks. Through this arrangement, it is possible to prevent any shifting whatever of the point 25 with reference to the longitudinal axis of the spindle as may be the case for instance when the spindle is laterally held fast or when the guide or bearing of the spindle is clamped over it or in the case of application of similar clamping means.

In the case of the bearing disclosed hereinabove and illustrated in accompanying drawings, the adjusting nut bears against the stationary body and the shiftable rods 24 are guided through a section of said stationary body.

What I claim is:

1. A bearing arrangement comprising, in combination, fixed supporting means having an inner frusto-conical bearing face; a spindle means rotatably mounted in said fixed supporting means and having an outer frusto-conical bearing face located opposite said inner bearing face of said supporting means, said spindle means being movable in said supporting means in one axial direction for decreasing the clearance, and in the opposite axial direction for increasing the clearance between said frusto-conical bearing faces; spring means abutting against said supporting means and against said spindle means and urging the latter to move in said one axial direction; manually operated adjusting nut means mounted on said supporting means; a plurality of connecting rods mounted in said supporting means and slidable in axial direction, said connecting rods engaging at one end thereof said adjustable nut means and at the other end thereof said spindle means whereby said spindle means can be axially moved in said opposite direction by adjustment of said adjustable nut means to move against the action of said spring means for increasing the clearance between said frusto-conical bearing faces whereby the clearance between said bearing faces can be adjusted during rotation and standstill of said spindle means.

2. A bearing arrangement as claimed in claim 1, and including a graduated scale secured to said nut means for indicating the position of said spindle means.

3. A bearing arrangement comprising, in combination, fixed supporting means having an inner frusto-conical bearing face; a spindle means rotatably mounted in said fixed supporting means and having an outer frusto-conical bearing face located opposite said inner bearing face of said supporting means, said spindle means being movable in said supporting means in one axial direction for decreasing the clearance, and in the opposite axial direction for increasing the clearance between said frusto-conical bearing faces, said spindle means including a fixed flange member; spring means abutting against said supporting means, and including a first abutment means abutting against one side of said flange member for urging said spindle means to move in said one axial direction; manually operated adjusting means mounted on said supporting means and movable in axial direction and including a second abutment means engaging the other side of said flange member, whereby said adjusting means during movement thereof in said opposite axial direction will urge said spindle means to move against the action of said spring means for increasing the clearance between said frusto-conical bearing faces whereby the clearance between said bearing faces can be adjusted during rotation and standstill of said spindle means.

4. A bearing arrangement comprising, in combination, fixed supporting means having an inner frusto-conical bearing face; a spindle means rotatably mounted in said fixed supporting means and having an outer frusto-conical bearing face located opposite said inner bearing face of said supporting means, said spindle means being movable in said supporting means in one axial direction for decreasing the clearance, and in the opposite axial direction for increasing the clearance between said frusto-conical bearing faces, said spindle means including a fixed flange member; spring means abutting against said supporting means, and including a first abutment means located on one side of said flange member and first bearing means located between said first abutment means and said flange member for urging said spindle means to move in said one axial direction; manually operated adjusting means mounted on said supporting means and movable in axial direction and including a second abutment means located on the other side of said flange member; second bearing means located between second abutment means and said flange member, said adjustment means urging during movement thereof in said opposite axial direction said spindle means to move against the action of said spring means for increasing the clearance between said frusto-conical bearing faces whereby the clearance between said bearing faces can be adjusted during rotation and standstill of said spindle means.

5. A bearing arrangement as claimed in claim 4 wherein said manually operated adjusting means include a nut means mounted on said supporting means, and a plurality of connecting rods mounted in said supporting means and slidable in axial direction, said connecting rods engaging at one end thereof said nut means and at the other end thereof said second abutment means.

6. A bearing arrangement as claimed in claim 5 wherein said first and second abutment means are rings surrounding said spindle means, and wherein said bearing means are roller bearings.

7. A bearing arrangement as claimed in claim 4 wherein said manually operated adjusting means are adjustable in said one axial direction to a position in which said spring means urge said outer bearing face into clamping engagement with said inner bearing face.

References Cited in the file of this patent

UNITED STATES PATENTS

| | | |
|---|---|---|
| 1,455,213 | Larsson | May 15, 1923 |
| 2,307,282 | Levesque | Jan. 5, 1943 |
| 2,389,687 | Rickenmann | Nov. 27, 1945 |